US007447268B2

(12) United States Patent
Sadowsky et al.

(10) Patent No.: US 7,447,268 B2
(45) Date of Patent: Nov. 4, 2008

(54) OFDM SYSTEM WITH PER SUBCARRIER PHASE ROTATION

(75) Inventors: John S. Sadowsky, Mesa, AZ (US); Shmuel Levy, Q. Tivon (IL); Sumeet Sandhu, San Jose, CA (US); Keith Holt, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 10/815,097

(22) Filed: Mar. 31, 2004

(65) Prior Publication Data

US 2005/0220199 A1 Oct. 6, 2005

(51) Int. Cl.
*H04L 27/28* (2006.01)

(52) U.S. Cl. .................................................... 375/260

(58) Field of Classification Search ................ 375/260, 375/267, 295, 296, 285, 298, 299; 370/208
See application file for complete search history.

(56) References Cited

U.S. PATENT DOCUMENTS

| | | | | |
|---|---|---|---|---|
| 4,112,430 | A * | 9/1978 | Ladstatter | 342/368 |
| 4,716,376 | A * | 12/1987 | Daudelin | 329/300 |
| 5,796,307 | A * | 8/1998 | Kumagai et al. | 330/149 |
| 6,442,214 | B1 | 8/2002 | Boleskei et al. | 375/299 |
| 6,687,315 | B2 * | 2/2004 | Keevill et al. | 375/341 |
| 6,754,511 | B1 * | 6/2004 | Halford et al. | 455/562.1 |
| 6,856,590 | B2 * | 2/2005 | Okada et al. | 370/208 |
| 6,934,320 | B2 * | 8/2005 | Tujkovic et al. | 375/146 |
| 6,940,917 | B2 * | 9/2005 | Menon et al. | 375/267 |
| 6,985,535 | B2 * | 1/2006 | Park et al. | 375/260 |
| 7,020,072 | B1 * | 3/2006 | Li et al. | 370/208 |
| 7,046,617 | B2 * | 5/2006 | Rotstein et al. | 370/203 |
| 7,113,548 | B2 * | 9/2006 | Tanaka et al. | 375/267 |
| 7,242,720 | B2 | 7/2007 | Sugiyama et al. | |
| 7,254,179 | B2 * | 8/2007 | Yoshida | 375/260 |
| 2002/0003773 | A1 * | 1/2002 | Okada et al. | 370/208 |
| 2002/0196734 | A1 | 12/2002 | Tanaka et al. | |
| 2003/0021351 | A1 | 1/2003 | Talwar | 375/267 |
| 2003/0099216 | A1 * | 5/2003 | Nilsson et al. | 370/335 |
| 2003/0099304 | A1 * | 5/2003 | Gore et al. | 375/267 |
| 2004/0081131 | A1 * | 4/2004 | Walton et al. | 370/344 |
| 2004/0081248 | A1 * | 4/2004 | Parolari | 375/259 |
| 2005/0025253 | A1 * | 2/2005 | Sakoda | 375/260 |
| 2005/0074067 | A1 * | 4/2005 | Nieto et al. | 375/260 |

(Continued)

FOREIGN PATENT DOCUMENTS

| | | |
|---|---|---|
| EP | 1024635 A1 | 8/2000 |

(Continued)

OTHER PUBLICATIONS

"Translation of portion of Korean Notice of Preliminary Rejection", 3 pgs. (Aug. 30, 2007).

*Primary Examiner*—Khanh C Tran
(74) *Attorney, Agent, or Firm*—The Law Offices of John C. Scott, LLC; John C. Scott

(57) ABSTRACT

Subcarrier phase rotation is implemented in an OFDM transmitting apparatus to overcome problems such as, for example, non-frequency selective multipath fading. In at least one embodiment, subcarrier phase rotation is practiced in an OFDM system implementing multiple input multiple output (MIMO) techniques.

29 Claims, 5 Drawing Sheets

U.S. PATENT DOCUMENTS

| | | | | |
|---|---|---|---|---|
| 2005/0100108 | A1* | 5/2005 | Yun et al. | 375/260 |
| 2005/0128938 | A1* | 6/2005 | Fang et al. | 370/210 |
| 2005/0135493 | A1* | 6/2005 | Maltsev et al. | 375/260 |
| 2005/0152473 | A1* | 7/2005 | Maltsev et al. | 375/299 |
| 2005/0201473 | A1* | 9/2005 | Lakkis | 375/260 |

FOREIGN PATENT DOCUMENTS

| | | | |
|---|---|---|---|
| EP | 1396956 | A1 | 3/2004 |
| KR | 02079489 | | 10/2002 |
| WO | WO-04013993 | A1 | 2/2004 |
| WO | WO-05099211 | A1 | 10/2005 |

* cited by examiner

50

| | Antenna 1 | Antenna 2 | |
|---|---|---|---|
| SUBCARRIER 1 | 1 | $1e^{j2\pi/B}$ | ⎫ |
| SUBCARRIER 2 | 1 | $1e^{j4\pi/B}$ | ⎬ COHERENCE BAND A |
| | ⋮ | ⋮ | |
| | 1 | $1e^{j2\pi(B-1)/B}$ | ⎭ |
| | 1 | $1e^{j2\pi/B}$ | ⎫ |
| | 1 | $1e^{j4\pi/B}$ | ⎬ COHERENCE BAND B |
| | ⋮ | ⋮ | |
| | 1 | $1e^{j2\pi(B-1)/B}$ | ⎭ |
| | 1 | $1e^{j2\pi/B}$ | ⎫ |
| | 1 | $1e^{j4\pi/B}$ | ⎬ COHERENCE BAND C |
| | ⋮ | ⋮ | |
| SUBCARRIER N | 1 | $1e^{j2\pi(B-1)/B}$ | ⎭ |

52     54

OFDM SYSTEM WITH PER SUBCARRIER PHASE ROTATION

TECHNICAL FIELD

The invention relates generally to wireless communications and, more particularly, to multicarrier wireless communications.

BACKGROUND

One of the problems that must often be overcome in a wireless communication system to ensure reliable, high quality communication is multipath fading. In a wireless channel, it is often the case that a transmitted signal will reach a receiver by more than one path. That is, the signal may reach the receiver by a direct path from the transmitter and also by one or more other paths that involve signal reflection from objects or structures in the surrounding environment. Because the lengths of the different paths will typically be different, the corresponding signal components received at the receiver will usually have different phases. Sometimes the phasing of the received signal components will result in partial or full cancellation of the signal at the receiver. This loss of signal at the receiver is known as multipath fading. In some situations, the fading will be frequency selective. That is, the fading will be more pronounced at some frequencies than at others. In other situations, however, the fading may occur in a relatively uniform fashion over a larger bandwidth. This may be referred to as non-frequency selective or "flat" multipath fading. Many techniques exist for effectively dealing with frequency-selective multi-path fading. However, there is a need for methods and structures that are capable of addressing flat multipath fading, particularly in systems that utilize multicarrier communication techniques.

DETAILED DESCRIPTION

Figure 1:
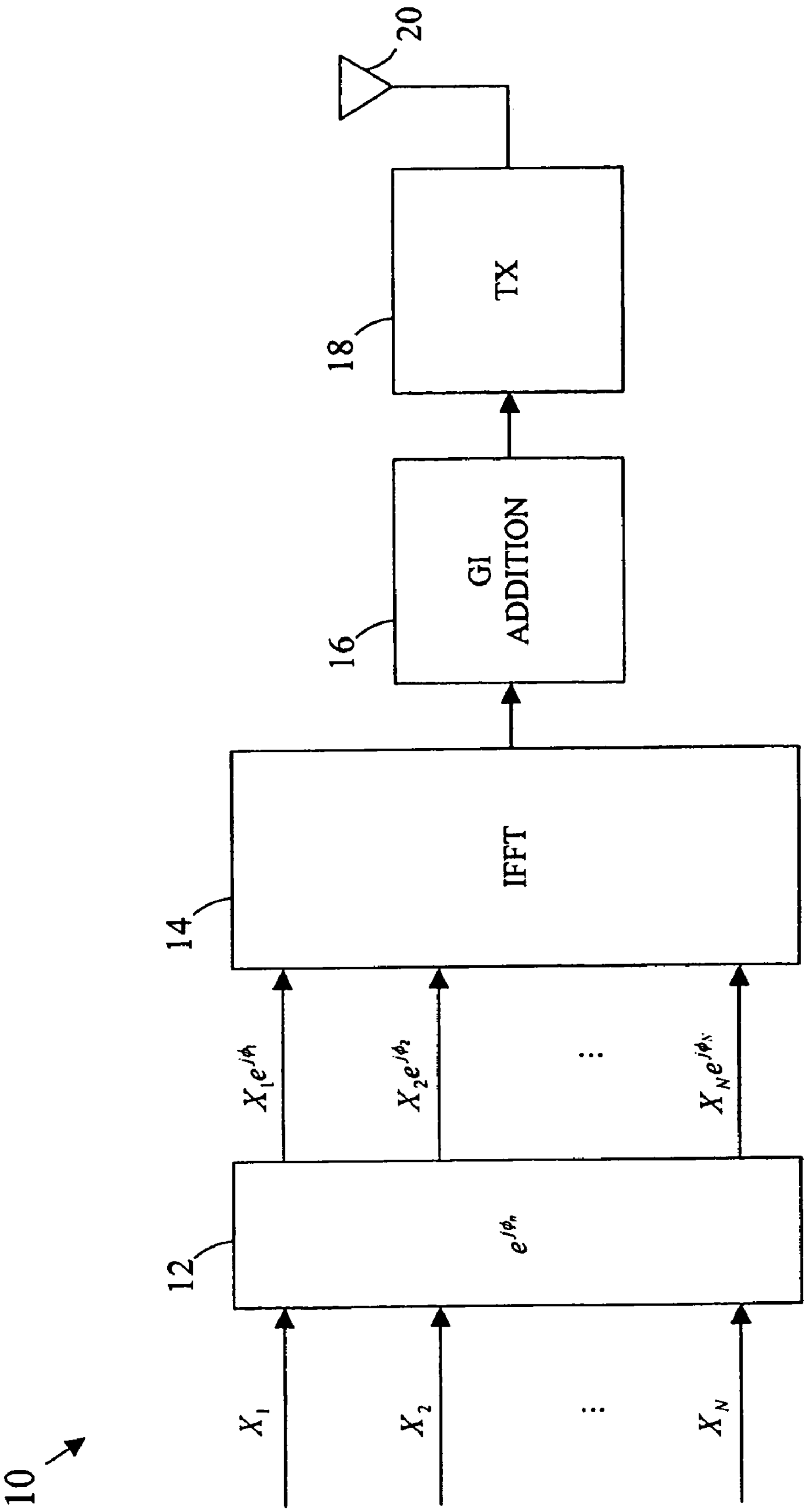
FIG. 1 is a block diagram illustrating an example orthogonal frequency division multiplexing (OFDM) transmitter arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive.

For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example orthogonal frequency division multiplexing (OFDM) transmitter arrangement 10 in accordance with an embodiment of the present invention. As illustrated, the transmitter arrangement 10 may include one or more of: a phase shift unit 12, an inverse fast Fourier transform (IFFT) 14, a guard interval (GI) addition unit 16, a transmitter 18, and an antenna 20. The phase shift unit 12 receives a number of modulation data symbols $X_n$ at an input thereof. The modulation data symbols may be received from, for example, a mapper/modulator that maps input data bits based on a predetermined modulation scheme. Any of a wide range of different modulation schemes may be used including, for example, binary phase shift keying (BPSK), quadrature phase shift keying (QPSK), 16 quadrature amplitude modulation (16 QAM), 64 QAM, and/or others. A serial to parallel converter or interleaver may be also be used to form a parallel input into the phase shift unit 12. Each of the modulation data symbols $X_n$ received by the phase shift unit 12 may be associated with, for example, a corresponding subcarrier of an OFDM signal to be generated and transmitted into the wireless channel.

The phase shift unit 12 applies a subcarrier dependent phase shift to each of the modulation symbols $X_n$ input thereto. For example, with reference to FIG. 1, the phase shift unit 12 applies a phase shift $\phi_1$ to symbol $X_1$ that is dependent upon the subcarrier associated with the symbol $X_1$, a phase shift $\phi_2$ to symbol $X_2$ that is dependent upon the subcarrier associated with the symbol $X_2$, and so on. The phase shifted data symbols are then applied to the IFFT 14 which converts the symbols from a frequency domain representation to a time domain representation. The GI addition unit 16 then adds a guard interval onto the time domain signal to form the OFDM symbol to be transmitted. The OFDM symbol is then input to the transmitter 18 which, among other things, upconverts and power amplifies the signal for transmission from the antenna 20. Any type of antenna 20 may be used including, for example, a dipole, a patch, a helical antenna, an array, and/or others.

The transmitter arrangement 10 is intended to be used in a multiple transmit antenna system. That is, two or more of such arrangements 10, each having its own antenna, are to be implemented within a transmitter. The subcarrier dependant phase shift sequences used for the different antennas in the multiple antenna system will typically be different. By providing these subcarrier dependent phase shifts to the modulation symbols, a wireless channel that is displaying flat multipath fading characteristics may be converted into a frequency selective fading channel that can then be dealt with in a known manner.

As described above, the phase shift unit 12 applies a subcarrier dependent phase shift to each of the modulation data symbols input thereto. A variety of different approaches may be used for determining the phase shifts based on subcarrier.

In one approach, for example, a phase term that is linearly related to the corresponding subcarrier frequency may be used, as follows:

$$\phi_n=\alpha f_n$$

where $f_n$ is the subcarrier frequency of the nth subcarrier relative to the channel center frequency and $\alpha$ is a constant. Other methods for generating phase terms that are linearly related (or non-linearly related) to subcarrier frequency may alternatively be used.

Figure 2:
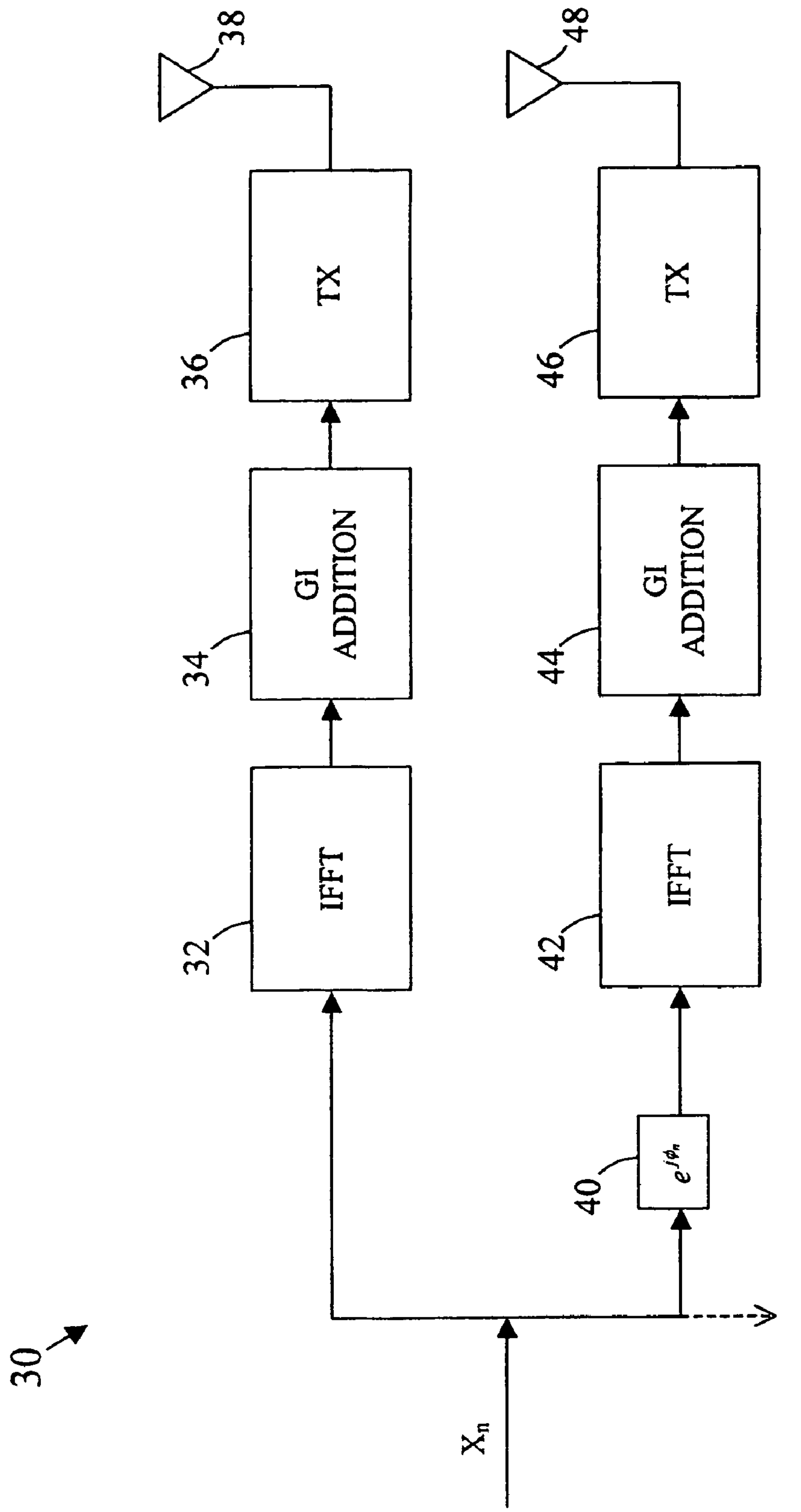
FIG. 2 is a block diagram illustrating an example OFDM transmitter arrangement that may be used in a MIMO based system in accordance with an embodiment of the present invention.

In at least one embodiment, features of the invention are implemented in a multiple input multiple output (MIMO) based multicarrier system. In a MIMO based system, multiple transmit antennas are used to transmit into a wireless channel (multiple input) and multiple receive antennas are used to receive the signal from the wireless channel (multiple output). MIMO systems are characterized by their ability, in the presence of rich multipath, to significantly increase the peak throughout that would otherwise be achievable in a single input, single output (SISO) system, without increasing the frequency bandwidth. FIG. 2 is a block diagram illustrating an example transmitter arrangement 30 that may be used in a MIMO based system in accordance with an embodiment of the present invention. As shown, the transmitter arrangement 30 includes: a first IFFT 32, a first GI addition unit 34, and a first transmitter 36 that are associated with a first transmit antenna 38 and a second IFFT 42, a second GI addition unit 44, and a second transmitter 46 that are associated with a second transmit antenna 48. In addition, the arrangement 30 includes a phase shift unit 40 that is associated with the second transmit antenna 48. A plurality of modulation data symbols $X_n$ are received and are directed along paths associated with each of the two transmit antennas 38, 48. In the first path (associated with antenna 38), no subcarrier dependent phase shifting takes place. The data symbols $X_n$ are first processed by the first IFFT 32 which transforms them from a frequency domain representation to a time domain representation. A guard interval is then added to the time domain signal by the GI addition unit 34. The resulting signal is then input to the transmitter 36 for transmission from the first transmit antenna 38. In the second path (associated with antenna 48), the modulation data symbols $X_n$ are first processed by the phase shift unit 40 which applies a subcarrier dependent phase shift to each of the symbols. The phase shifted symbols are then processed by the second IFFT 42, the second GI addition unit 44, and the second transmitter 46, and are thereafter transmitted from the second transmit antenna 48.

By inserting subcarrier dependent phase factors into the modulation data symbols associated with at least one of the two transmit antennas 38, 48, a wireless channel suffering from flat fading can be converted into a frequency selective channel that can be dealt with in a known manner. In an alternative arrangement, a different subcarrier-dependent phase sequence may be applied for each of the two transmit antennas 38, 48. Although shown with two transmit antennas 38, 48 in the illustrated embodiment, it should be appreciated that MIMO based transmitter arrangements having more than 2 transmit antennas may alternatively be used. In such an arrangement, at least one of the transmit antennas should apply subcarrier dependent phase shifts to the corresponding modulation symbols, as described above. In one possible implementation, subcarrier dependent phase shifts are applied for more than one transmit antenna in the multi-antenna arrangement, with a different subcarrier dependent phase sequence being used for each antenna.

Figure 3:
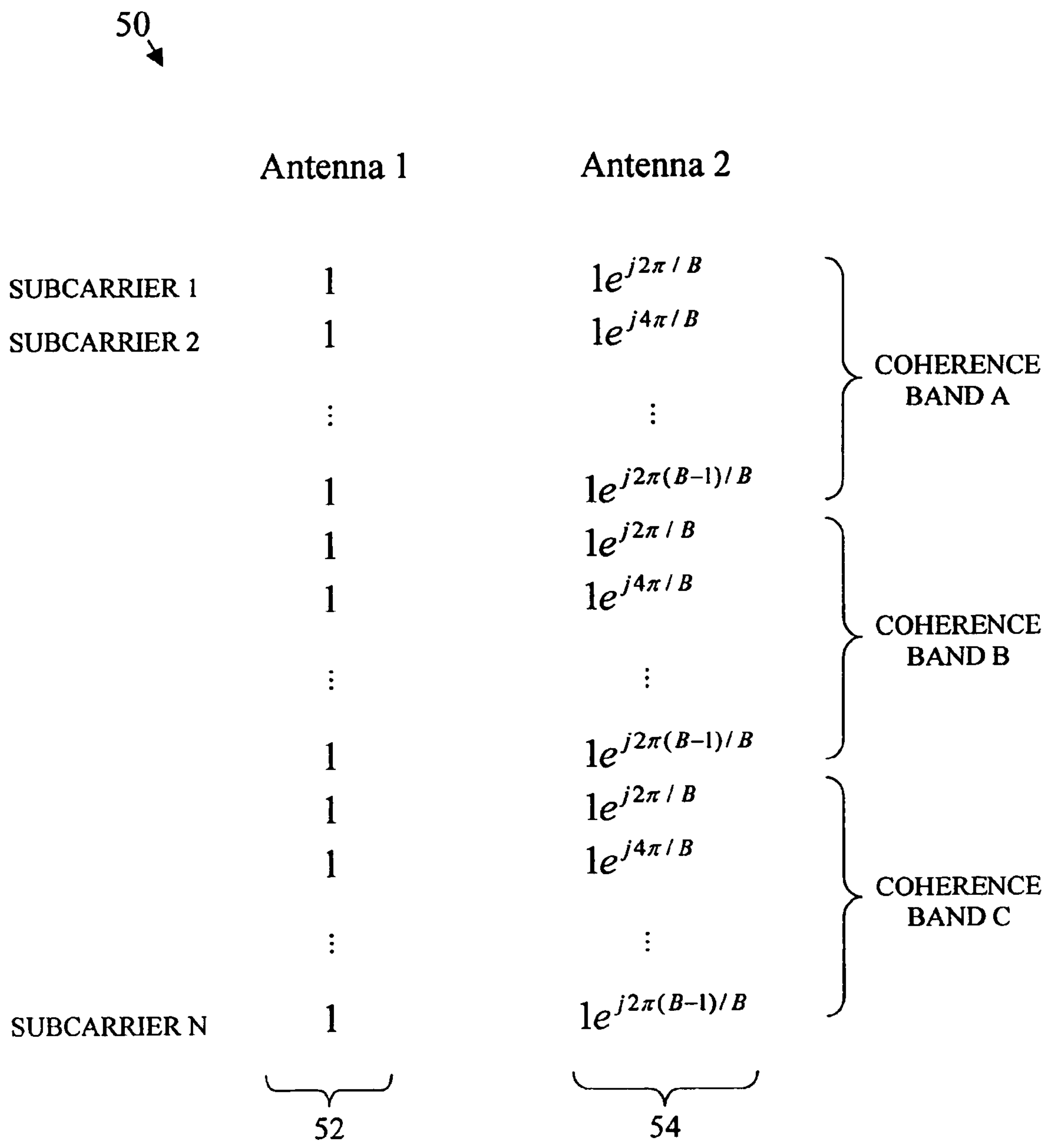
FIG. 3 is a table illustrating example subcarrier preambles that may be used in a MIMO based transmitter arrangement having two transmit antennas in accordance with an embodiment of the present invention.

In at least one MIMO based embodiment of the invention, a set of orthogonal or quasi-orthogonal spatial weights are applied to modulation symbols across groups of tones that are within a coherence bandwidth (B) of one another. Coherence bandwidth refers to a range of frequencies within which frequency components tend to all fade in a similar or correlated fashion in a system. In one possible phase shift approach, for example, a phase shift of 360/B (degrees) is applied from tone to tone across each group of B tones associated with at least one of the transmit antennas in a multi-antenna arrangement. FIG. 3 is a table 50 illustrating the subcarrier preambles that may be used to implement this approach in a MIMO based transmitter arrangement having two transmit antennas in accordance with an embodiment of the present invention. As illustrated, the preambles 52 associated with the subcarriers of a first antenna (ANTENNA 1) are not phase shifted, while the preambles 54 associated with the subcarriers of a second antenna (ANTENNA 2) are shifted in a subcarrier dependent manner. The subcarriers are divided into three different coherence bands (COHERENCE BAND A, COHERENCE BAND B, and COHERENCE BAND C) that are each approximately a coherence bandwidth wide. For each of the coherence bands, the subcarriers are phase shifted from subcarrier to subcarrier by $2\pi/B$ radians (or 360/B degrees). The pattern is then repeated for the next coherence band. This technique can be extended for use in a system having 3 or more antennas. For example, the phase may be increased from $e^{j2\pi/B}$ to $e^{j(M-1)2\pi/B}$ on the Mth transmit antenna. Other techniques may alternatively be used. The motivation for the above-described techniques are as follows. A frequency selective fade is approximately constant over a coherence bandwidth. In order to reliably transmit the preamble over a coherence bandwidth, it is best to rotate it uniformly over all spatial directions, so that at least some of the received tones experience a good signal level. As an exact coherence bandwidth value if often unattainable, an approximation of the coherence bandwidth may be used in the above-described techniques.

In another approach for use in a MIMO based system, the same signal may be transmitted on different antennas by successively delaying the signal on each antenna. That is, the signal transmitted from the Mth transmit antenna is cyclically delayed by (M−1)D time samples with respect to the first antenna, where D is the cyclic delay. This technique is capable of making the transmitted signal appear omnidirectional. The cyclic delay may also be adapted to the channel delay spread. For example, a smaller cyclic delay may be used with lower delay spreads and a larger cyclic delay may be used with higher delay spreads. In general, delay diversity can be proprietary and does not require standardization.

One of the problems that arises when using multiple transmit antennas that each transmit the same signal (such as in a MIMO based system) is that a directional antenna pattern often results. In at least one embodiment of the present invention, subcarrier dependent phases are selected for subcarriers associated with at least one transmit antenna in a multiple transmit antenna arrangement in a manner that results in an omni-directional aggregate radiation pattern over all of the subcarriers. Although the radiation pattern of each individual subcarrier cannot typically be made omni-directional using this technique, the aggregate pattern over all of the subcarriers can be made to be substantially omni-directional in an open loop transmit diversity system. As before, subcarrier dependent phases may be applied to a single antenna or to multiple antennas (using different subcarrier dependent phase sequences) in the multi-antenna arrangement.

Figure 4:
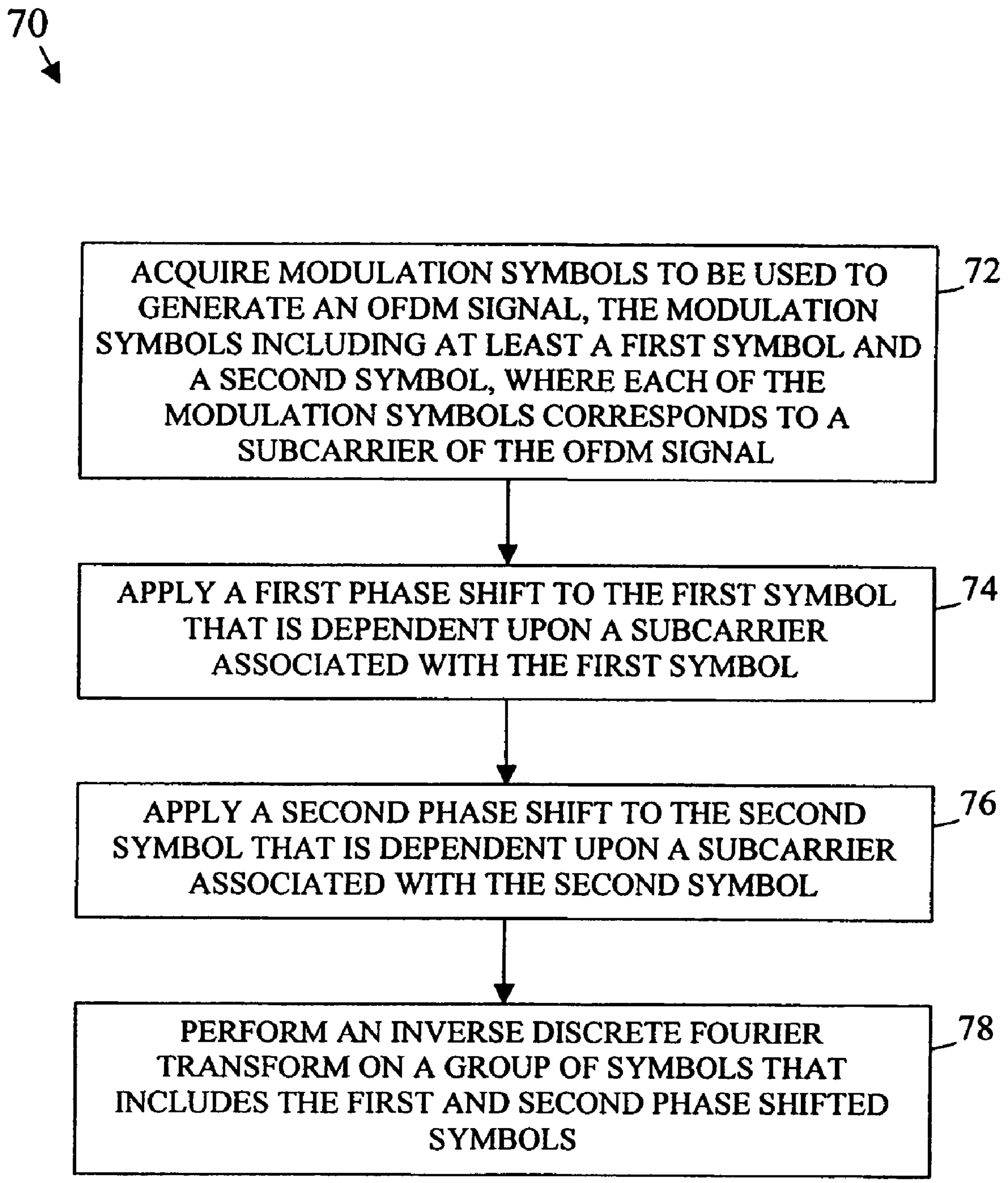
FIG. 4 is a flowchart illustrating an example method for use in generating an OFDM transmit signal in accordance with an embodiment of the present invention.

FIG. 4 is a flowchart illustrating an example method 70 for use in generating an OFDM transmit signal in an OFDM system in accordance with an embodiment of the present invention. The method 70 may be used to generate transmit signals in both MIMO based systems and non MIMO based systems. In a MIMO based system, the method 70 may be used, for example, to generate an OFDM signal for transmission from one (or more than one) of a plurality of transmit antennas. First, modulation symbols are acquired that are to be used to generate an OFDM signal (block 72). The modulation symbols include at least a first symbol and a second symbol, but may include any number of symbols. Each of the modulation symbols may correspond to a subcarrier of the OFDM symbol. A first phase shift is applied to the first symbol that is dependent upon a subcarrier associated with the first symbol (block 74). A second phase shift is applied to the second symbol that is dependent upon a subcarrier associated with the second symbol (block 76). An inverse discrete Fourier transform (e.g., a fast Fourier transform, etc.) is subsequently performed on a group of symbols that includes the phase shifted first and second symbols (block 78). In at least one embodiment, all of the modulation symbols that are to be used to generate the OFDM signal are subjected to a subcarrier dependent phase shift and are included in the group of symbols that are transformed. After the inverse discrete Fourier transform is performed, a guard interval may be added to the resulting signal. The signal may then, for example, be up-converted to an RF transmit frequency, power amplified, and transmitted from an antenna or other form of transducer.

Figure 5:
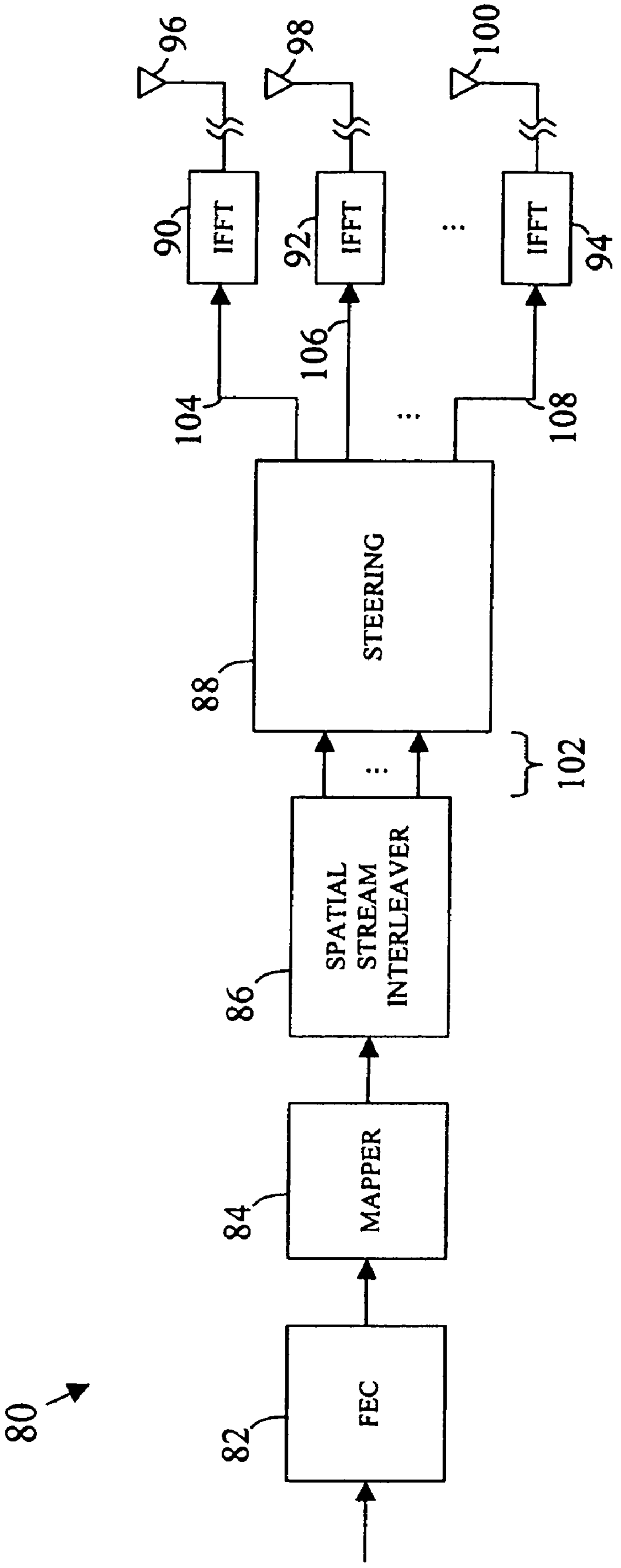
FIG. 5 is a block diagram illustrating an example OFDM transmitter arrangement that may be used in a MIMO based system in accordance with another embodiment of the present invention.

FIG. 5 is a block diagram illustrating an example OFDM transmitter arrangement 80 in accordance with another embodiment of the present invention. The transmitter arrangement 80 may be used, for example, in a system implementing MIMO techniques. As illustrated, the transmitter arrangement 80 may include one or more of: a forward error correction (FEC) coder 82, a mapper 84, a spatial stream interleaver 86, a steering unit 88, a plurality of inverse fast Fourier transform (IFFT) units 90, 92, 94, and a plurality of antennas 96, 98, 100. The FEC coder 82 receives data at an input thereof and codes the data based on a predetermined error code. Any of a variety of different error codes may be used. The mapper 84 maps the coded data based on a predetermined modulation scheme (e.g., BPSK, QPSK, 16 QAM, 64 QAM, and/or others) to generate a serial stream of modulation symbols at an output thereof. The spatial stream interleaver 86 then interleaves the serial stream of modulation symbols into a plurality of spatial streams 102. Any number of spatial streams maybe generated in this fashion. The steering unit 88 receives the spatial streams output by the spatial stream interleaver 86 and steers the associated symbols to a number of antenna paths 104, 106, 108 in a predetermined manner. In at least one embodiment, the steering unit 88 achieves its function by multiplying input data (received within the serial streams 102) by a steering matrix. Each of the antenna paths 104, 106, 108 includes a corresponding IFFT 90, 92, 94 to convert corresponding modulation symbols from a frequency domain representation to a time domain representation. Although illustrated as IFFT's, it should be appreciated that any type of discrete Fourier transform may be used. Each of the antenna paths 104, 106, 108 leads to a corresponding antenna 96, 98, 100. As before, any type of antennas may be used. Other circuitry may also be included between each IFFT and its corresponding antenna (e.g., a guard interval addition unit, an RF transmitter, etc.). Any number of antenna paths may be used. The number of spatial streams 102 may or may not be equal to the number of antenna paths 104, 106, 108.

In at least one embodiment of the present invention, the steering unit 88 is used to provide subcarrier dependent phase terms to the data symbols that will be output to at least one of the antenna paths 104, 106, 108. The subcarrier dependent phase terms may be selected as described previously. In at least one approach, an additional matrix multiplication may be performed within the steering unit 88 to provide the phase terms to the desired modulation symbols. For example, if the steering matrix to be used in a particular implementation is represented as V*, then the phase terms maybe introduced by modifying the steering matrix as follows:

$$V^{(k_{sc})} = D(f_{k_{SC}}; \tau)V^* \text{ where}$$

$$D(f; \tau) = \begin{bmatrix} 1 & 0 & 0 \\ 0 & e^{j2\pi f\tau_1} & 0 \\ 0 & 0 & e^{j2\pi f\tau_2} \end{bmatrix}$$

where $V^{(k_{sc})}$ is the modified steering matrix, $k_{sc}$ is the subcarrier index, $f_{k_{sc}}$ is the subcarrier frequency, and $\tau_1$ and $\tau_2$ are delays associated with corresponding antenna paths. In the arrangement 80 of FIG. 5, if the number of spatial streams 102 is equal to the number of antenna paths, then the steering matrix V* will be the identity matrix. In such a case, the arrangement 80 of FIG. 5 will be similar to the arrangement 30 of FIG. 2. Alternatively, the steering matrix V* may be any fixed unitary matrix; for example, the Walsh matrix previously displayed.

The linear phase term as just described is applied after the fixed steering matrix V*. In this case, the phase term $$e^{j2\pi f_{k_{SC}}\tau_i}$$

is applied to the i'th antenna. In a MIMO system, it is possible to have more transmit antennas than spatial streams. The number of rows of V is the number of transmit antennas and the number of columns is the number of spatial streams. Now, in addition to applying the phasing per antenna, it is also possible to apply phases per spatial stream. In this case, we have the reverse order of V* and D:

$$V^{k_{sc})} = V^* D(f_{k_{SC}}; \tau)$$

and the dimension of square matrix $D(f;\tau)$ is now the number of spatial streams (rather than the number of transmit antennas).

Although various embodiments have been described above in the context of MIMO based systems that typically have multiple receiver antennas, it should be appreciated that the above described principles may also be implemented in systems that use multiple transmit antennas and only a single receive antenna.

The inventive techniques and structures may be used in any of a wide variety of different wireless devices, components, and systems. For example, in various embodiments, features of the invention may be implemented within laptop, desktop, palmtop, and/or tablet computers having wireless networking functionality, personal digital assistants (PDAs) having wireless networking functionality, cellular telephones and other handheld wireless communicators, pagers, network interface cards (NICs) and other network interface structures, radio frequency integrated circuits, and/or other devices, systems, and components.

It should be appreciated that the individual blocks illustrated in the block diagrams herein may be functional in nature and do not necessarily correspond to discrete hardware elements. For example, in at least one implementation, two or more of the blocks within a block diagram (e.g., FIG. 1) may be realized in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and/or hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:

a first phase shifter to provide subcarrier dependent phase shifts to modulation symbols to generate first phase shifted modulation symbols, wherein said modulation symbols correspond to subcarriers of an orthogonal frequency division multiplexing (OFDM) signal;

a first inverse discrete Fourier transform unit to convert said first phase shifted modulation symbols from a frequency domain representation to a time domain representation for transmission into a wireless channel;

a second phase shifter to provide subcarrier dependent phase shifts to said modulation symbols to generate second phase shifted modulation symbols, wherein said second phase shifter provides different subcarrier dependent phase shifts to said modulation symbols than said first phase shifter; and a second inverse discrete Fourier transform unit to convert said second phase shifted modulation symbols from a frequency domain representation to a time domain representation;

wherein said subcarrier dependent phase shifts of said first and second phase shifters are selected to convert a wireless channel displaying flat multipath fading into a wireless channel displaying frequency selective multipath fading;

wherein said first inverse discrete Fourier transform unit is associated with a first antenna path and said second inverse discrete Fourier transform unit is associated with a second antenna path.

2. The apparatus of claim 1, further comprising:

at least one other phase shifter to provide subcarrier dependent phase shifts to said modulation symbols to generate other phase shifted modulation symbols, wherein said at least one other phase shifter provides different subcarrier dependent phase shifts to said modulation symbols than said first and second phase shifters; and at least one other inverse discrete Fourier transform unit to convert said other phase shifted modulation symbols from a frequency domain representation to a time domain representation.

3. The apparatus of claim 1, wherein:

said first and second inverse discrete Fourier transform units are inverse fast Fourier transform (FFT) units.

4. The apparatus of claim 1, wherein:

said first phase shifter provides a phase shift to a first modulation symbol based on a difference between a frequency of a corresponding subcarrier and a center frequency of a channel in which said OFDM symbol is to be transmitted.

5. The apparatus of claim 1, wherein:

said first phase shifter provides subcarrier dependent phase shifts to said modulation symbols based on an approximate coherence bandwidth associated with the apparatus.

6. The apparatus of claim 1, wherein:

said modulation symbols include at least a first modulation symbol and a second modulation symbol, said first modulation symbol being associated with a first subcarrier and said second modulation symbol being associated with a second subcarrier that is adjacent to said first subcarrier in frequency, wherein said phase shifter provides phase shifts to said first and second modulation symbols that differ by approximately 360/B degrees, where B represents an approximate coherence bandwidth.

7. A method comprising:

acquiring modulation symbols to be used to generate an orthogonal frequency division multiplexing (OFDM) signal, said modulation symbols including at least a first symbol and a second symbol, wherein said modulation symbols correspond to subcarriers of the OFDM signal;

applying a first phase shift to said first symbol that is dependant upon the subcarrier associated with said first symbol to generate a first phase shifted symbol; and applying a second phase shift to said second symbol that is dependent upon the subcarrier associated with said second symbol to generate a second phase shifted symbol;

wherein said first phase shift and said second phase shift are selected to convert a wireless channel displaying flat multipath fading into a wireless channel displaying frequency selective multipath fading;

wherein said first phase shift and said second phase shift differ by approximately 360/B degrees, where B represents an approximate coherence bandwidth of a corresponding channel.

8. The method of claim 7, further comprising:

applying an inverse discrete Fourier transform to a group of modulation symbols that includes said first phase shifted symbol and said second phase shifted symbol.

9. The method of claim 8, wherein:

said modulation symbols to be used to generate said OFDM signal include other symbols in addition to said first symbol and said second symbol, said method further comprising applying subcarrier dependent phase shifts to said other symbols to generate other phase shifted symbols, wherein said group of modulation symbols includes said other phase shifted symbols.

10. The method of claim 7, wherein:

said first and second phase shifted symbols are to be transmitted from a first antenna; and said method further comprises:

applying a third phase shift to said first symbol that is dependant upon the subcarrier associated with said first symbol to generate a third phase shifted symbol, wherein said third phase shift is different from said first phase shift; and applying a fourth phase shift to said second symbol that is dependent upon the subcarrier associated with said second symbol to generate a fourth phase shifted symbol, wherein said fourth phase shift is different from said second phase shift;

wherein said third and fourth phase shifted symbols are to be transmitted from a second antenna, said second antenna being different from said first antenna.

11. An apparatus comprising:

an interleaver to separate a serial input stream of modulation symbols into N spatial streams, where N is a positive integer greater than 1;

a steering unit to receive said N spatial streams and to steer the associated modulation symbols into M antenna paths, where M is a positive integer greater than 1, wherein said steering unit provides subcarrier dependent phase shifts to modulation symbols associated with at least one of said N spatial streams, wherein said subcarrier dependent phase shifts are selected to convert a wireless channel displaying flat multipath fading into a wireless channel displaying frequency selective multipath; and a mapper to map input data bits into a serial stream of modulation symbols based on a predetermined modulation scheme, said serial stream of modulation symbols for delivery to an input of said interleaver.

12. The apparatus of claim 11, wherein:

said M antenna paths includes at least a first path and a second path; and said apparatus further includes a first inverse discrete Fourier transform unit within said first path and a second inverse discrete Fourier transform unit within said second path.

13. The apparatus of claim 11, wherein:

said first and second inverse discrete Fourier transform units are inverse fast Fourier transform units.

14. The apparatus of claim 11, wherein N equals M.

15. The apparatus of claim 11, wherein N does not equal M.

16. The apparatus of claim 11, wherein:

said apparatus is adapted for use within a multiple input multiple output (MIMO) based transmitting device.

17. The apparatus of claim 11, further comprising:

a forward error correction (FEC) coder to encode user data based on a predetermined error code, said FEC coder to deliver encoded data bits to an input of said mapper.

18. The apparatus of claim 11, wherein:

said steering unit provides subcarrier dependent phase shifts to modulation symbols associated with at least two spatial streams, wherein different phase sequences are used for each of said at least two spatial streams.

19. The apparatus of claim 11, wherein:

said steering unit provides subcarrier dependent phase shifts to modulation symbols associated with N- 1 of said N spatial streams, wherein different phase sequences are used for each of said N-1 spatial streams.

20. The apparatus of claim 11, wherein:

said steering unit provides subcarrier dependent phase shifts to modulation symbols associated with each of said N spatial streams, wherein different phase sequences are used for each of said N spatial streams.

21. A system comprising:

a first phase shifter to provide subcarrier dependent phase shifts to modulation symbols to generate first phase shifted modulation symbols, wherein said modulation symbols correspond to subcarriers of an orthogonal frequency division multiplexing (OFDM) signal;

a first inverse discrete Fourier transform unit to convert said first phase shifted modulation symbols from a frequency domain representation to a time domain representation; and at least one dipole antenna element to transmit a radio frequency (RF) signal that includes said time domain representation of said phase shifted modulation symbols into a wireless channel;

wherein said modulation symbols include at least a first modulation symbol and a second modulation symbol, said first modulation symbol being associated with a first subcarrier and said second modulation symbol being associated with a second subcarrier that is adjacent to said first subcarrier in frequency, wherein said first phase shifter provides phase shifts to said first and second modulation symbols that differ by approximately 360/B degrees, where B represents an approximate coherence bandwidth of said wireless channel;

wherein said subcarrier dependent phase shifts are selected to convert a wireless channel displaying flat multipath fading into a wireless channel displaying frequency selective multipath fading.

22. The system of claim 21, further comprising:

a guard interval addition unit to add a guard interval to said time domain representation of said phase shifted modulation symbols.

23. The system of claim 22, further comprising:

an RF transmitter located between said guard interval addition unit and said at least one dipole antenna element to generate said RF signal using said time domain representation of said phase shifted modulation symbols.

24. An article comprising a computer readable storage medium having instructions stored thereon that, when executed by a computing platform, operate to:

acquire modulation symbols including at least a first symbol and a second symbol, said modulation symbols corresponding to subcarriers of an OFDM signal;

apply a first phase shift to said first symbol that is dependant upon the subcarrier associated with said first symbol to generate a first phase shifted symbol;

apply a second phase shift to said second symbol that is dependent upon the subcarrier associated with said second symbol to generate a second phase shifted symbol;

apply a third phase shift to said first symbol that is dependant upon the subcarrier associated with said first symbol to generate a third phase shifted symbol, wherein said third phase shift is different from said first phase shift; and apply a fourth phase shift to said second symbol that is dependent upon the subcarrier associated with said second symbol to generate a fourth phase shifted symbol, wherein said fourth phase shift is different from said second phase shift;

wherein said first and second phase shifted symbols are to be transmitted from a first antenna and said third and fourth phase shifted symbols are to be transmitted from a second antenna, said second antenna being different from said first antenna;

wherein said first, second, third, and fourth phase shifts are selected to convert a wireless channel displaying flat multipath fading into a wireless channel displaying frequency selective multipath fading.

25. The article of claim 24, wherein said instructions, when executed by the computing platform, further operate to:

apply an inverse discrete Fourier transform to a group of modulation symbols that includes said first phase shifted symbol and said second phase shifted symbol.

26. The article of claim 24, wherein:

to apply a first phase shift to said first symbol includes to apply a phase shift that is linearly related to a frequency of the subcarrier associated with said first symbol.

27. The article of claim 24, wherein:

to apply a first phase shift to said first symbol includes to apply a phase shift that is non-linearly related to a frequency of the subcarrier associated with said first symbol.

28. The article of claim 24, wherein:

to apply a first phase shift to said first symbol includes to apply a phase shift that is related to an approximate coherence bandwidth of a corresponding channel.

29. The article of claim 24, wherein:

said first and second phase shifts differ by approximately 360/B degrees, where B represents an approximate coherence bandwidth of a corresponding wireless channel.

* * * * *